United States Patent
Ma

(10) Patent No.: US 9,154,991 B2
(45) Date of Patent: Oct. 6, 2015

(54) PCC QOS AUTHORIZATION BASED ON RULE SPLIT AND FLOW DIRECTION

(71) Applicant: ALCATEL-LUCENT CANADA INC., Ottawa (CA)

(72) Inventor: Haiqing H. Ma, Nepean (CA)

(73) Assignee: Alcatel Lucent, Boulogne-Billancourt (FR)

( * ) Notice: Subject to any disclaimer, the term of this patent is extended or adjusted under 35 U.S.C. 154(b) by 153 days.

(21) Appl. No.: 13/891,358

(22) Filed: May 10, 2013

(65) Prior Publication Data

US 2014/0334303 A1 Nov. 13, 2014

(51) Int. Cl.
*H04M 15/00* (2006.01)
*H04W 28/02* (2009.01)

(52) U.S. Cl.
CPC .......... *H04W 28/0268* (2013.01); *H04M 15/66* (2013.01)

(58) Field of Classification Search
USPC ................. 370/231–235, 252–328, 401–412; 455/436–452; 709/224–229
See application file for complete search history.

(56) References Cited

U.S. PATENT DOCUMENTS

| | | | |
|---|---|---|---|
| 8,121,049 B2 * | 2/2012 | Lidstrom et al. | 370/252 |
| 8,155,020 B2 * | 4/2012 | Giaretta et al. | 370/252 |
| 8,442,522 B2 * | 5/2013 | Pancorbo Marcos et al. | 455/432.1 |
| 8,605,583 B2 * | 12/2013 | Cutler et al. | 370/230 |
| 8,605,655 B1 * | 12/2013 | Sahai et al. | 370/328 |
| 8,645,510 B2 * | 2/2014 | Siddam | 709/221 |
| 8,675,487 B2 * | 3/2014 | Siddam et al. | 370/235 |
| 8,700,040 B2 * | 4/2014 | Pancorbo Marcos et al. | 455/436 |
| 8,787,399 B2 * | 7/2014 | Hedman et al. | 370/412 |
| 2013/0114408 A1 * | 5/2013 | Sastry et al. | 370/231 |
| 2013/0182715 A1 * | 7/2013 | Pandya et al. | 370/401 |

* cited by examiner

*Primary Examiner* — Man Phan
(74) *Attorney, Agent, or Firm* — Kramer & Amado, P.C.

(57) ABSTRACT

Various exemplary embodiments relate to a method performed by a policy and charging rules node (PCRN) of updating a policy and charging control (PCC) rule. The method includes: receiving a filter update request comprising a new filter and a reference filter; matching the reference filter with a previously requested PCC rule; determining a set of filters associated with the service data flow; determining whether any filter of the set of filters is removed; and authorizing quality of service (QoS) information based on the remaining filters of the set of filters. Various exemplary embodiments relate to a non-transitory machine-readable storage medium encoded with instructions executable by a processor for performing the method.

16 Claims, 6 Drawing Sheets

FIG. 5

| RULE NAME | SERVICE DATA FLOW FILTERS | QoS PARAMETERS | FLOW DIRECTION | BEARER | SESSION |
|---|---|---|---|---|---|
| 0x82A1 | 1:0x10F2CEE32<br>2:0x2920B92C | {6;10mbps;10mbps} | {BIDIRECTIONAL, DOWNLINK} | {0x28B2} | {0x732A} |
| 0x82A1 | 3:0x32B56FE1 | {6;9mbps;9mbps} | {BIDIRECTIONAL} | {0x28B2} | {0x732A} |
| 0x82A1 | 4:0x4592B832 | {6;1mbps;0mbps} | {UPLINK} | {0x28B2} | {0x732A} |
| 0x82A1 | 1:0x10F2CE32<br>2:0x2920B92C<br>3:0x12345678<br>4:0x87654321 | {6;10mbps;15mbps} | {BIDIRECTIONAL, DOWNLINK, UPLINK, DOWNLINK} | {0x28B2} | {0x732A} |
| ... | ... | ... | ... | ... | ... |

FIG. 6

| SESSION | SERVICE DATA FLOW FILTERS | QoS PARAMETERS | FLOW DIRECTION | FLOW STATUS | FLOW USAGE |
|---|---|---|---|---|---|
| 0xE426 | 1:0x10F2CEE32<br>2:0x2920B92C<br>3:0x32B56FE1<br>4:0x4592B832 | 1,2,4:<br>{6;20mbps;20mbps}<br>3:<br>{6;9mbps;9mbps} | {BIDIRECTIONAL; DOWNLINK; BIDIRECTIONAL; UPLINK} | {OPEN, OPEN, REMOVED, REMOVED} | {N/A, N/A, N/A, RTCP} |

PCC QOS AUTHORIZATION BASED ON RULE SPLIT AND FLOW DIRECTION

TECHNICAL FIELD

Various exemplary embodiments disclosed herein relate generally to communications networks.

BACKGROUND

As the demand increases for varying types of applications within mobile telecommunications networks, service providers must constantly upgrade their systems in order to reliably provide this expanded functionality. What was once a system designed simply for voice communication has grown into an all-purpose network access point, providing access to a myriad of applications including text messaging, multimedia streaming, and general Internet access. As seen in second and third generation networks, voice services must be carried over dedicated voice channels and directed toward a circuit-switched core, while other service communications are transmitted according to the Internet Protocol (IP) and directed toward a different, packet-switched core. This led to unique problems regarding application provision, metering and charging, and quality of experience (QoE) assurance.

In an effort to simplify the dual core approach of the second and third generations, the 3rd Generation Partnership Project (3GPP) has recommended a new network scheme it terms "Long Term Evolution" (LTE). In an LTE network, all communications are carried over an IP channel from user equipment (UE) to an all-IP core called the Evolved Packet Core (EPC). The EPC then provides gateway access to other networks while ensuring an acceptable QoE and charging a subscriber for their particular network activity.

The 3GPP generally describes the components of the EPC and their interactions with each other in a number of technical specifications. Specifically, 3GPP TS 29.212, 3GPP TS 29.213, and 3GPP TS 29.214 describe the Policy and Charging Rules Function (PCRF), Policy and Charging Enforcement Function (PCEF), and Bearer Binding and Event Reporting Function (BBERF) of the EPC. These specifications further provide some guidance as to how these elements interact in order to provide reliable data services and charge subscribers for use thereof.

For example, 3GPP TS 29.212, 29.213, and 29.214 specifications provide some guidance on generating policy and charging control (PCC) rules. 3GPP TS 29.212 describes the steps taken by a PCRF when it receives requests for PCC rules from the PCEF or requests for quality of service (QoS) rules from the BBERF. 3GPP TS 29.213 describes QoS authorization based on requested QoS for service data flows (SDF). 3GPP TS 29.214 describes the steps taken by a PCRF when it receives request for PCC rules from an application function (AF).

The specifications, however, do not provide for determining QoS information when sessions are updated with new filters. More specifically, the specifications do not handle updates of PCC rules where QoS information is combined for multiple filters including removed filters.

SUMMARY

In view of the foregoing, it would be desirable to provide a Policy and Charging Rules Node (PCRN) implementing a PCRF capable of updating PCC rules based on partial filter information. In particular, it would be desirable to generate PCC rules that effectively satisfy update requests accounting for removed filters and filter directions.

In light of the present need for a system of providing updated PCC rules, a brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various exemplary embodiments relate to a method performed by a policy and charging rules node (PCRN) of updating a policy and charging control (PCC) rule. The method includes: receiving a filter update request comprising a new filter and a reference filter; matching the reference filter with a previously requested PCC rule; determining a set of filters associated with the service data flow; determining whether any filter of the set of filters is removed; and authorizing quality of service (QoS) information based on the remaining filters of the set of filters.

In various embodiments, the step of determining whether a filter has been removed includes determining whether the filter is associated with the Real Time Control Protocol (RTCP) and determining that the filter has been removed based on the filter being associated with RTCP.

In various embodiments, the filter update request further includes a flow direction, and the step of authorizing QoS information includes adding the bandwidth for each filter having a direction consistent with the flow direction.

In various embodiments, the step of matching the reference flow with a previously requested PCC rule includes searching a record of IP-CAN sessions for a session including the reference filter. The record of IP-CAN sessions may include a filter-ID assigned by the PCRN.

In various embodiments, the method further includes generating a filter ID for the new filter.

In various embodiments, the step of determining whether a filter has been removed includes searching a record of application function (AF) sessions. The step of determining whether a filter has been removed may include determining whether a flow-status for the filter indicates that the filter has been removed.

In various embodiments, the step of authorizing QoS information includes: determining an uplink bandwidth as the sum of filters compatible with the uplink direction; and determining a downlink bandwidth as the sum of filters compatible with the downlink direction.

Various exemplary embodiments relate to a non-transitory machine-readable storage medium encoded with instructions for performing the above described method.

It should be apparent that, in this manner, various exemplary embodiments enable updating PCC rules with new filters. In particular, by excluding removed filters from the updated PCC rule and taking into account flow direction, a PCRN may authorize QoS information for updated PCC rules.

BRIEF DESCRIPTION OF THE DRAWINGS

In order to better understand various exemplary embodiments, reference is made to the accompanying drawings, wherein:

FIG. 5 illustrates an exemplary data arrangement for storing PCC rules; and

FIG. 6 illustrates a flowchart showing an exemplary method 600 of updating a PCC rule.

DETAILED DESCRIPTION

Figure 1:
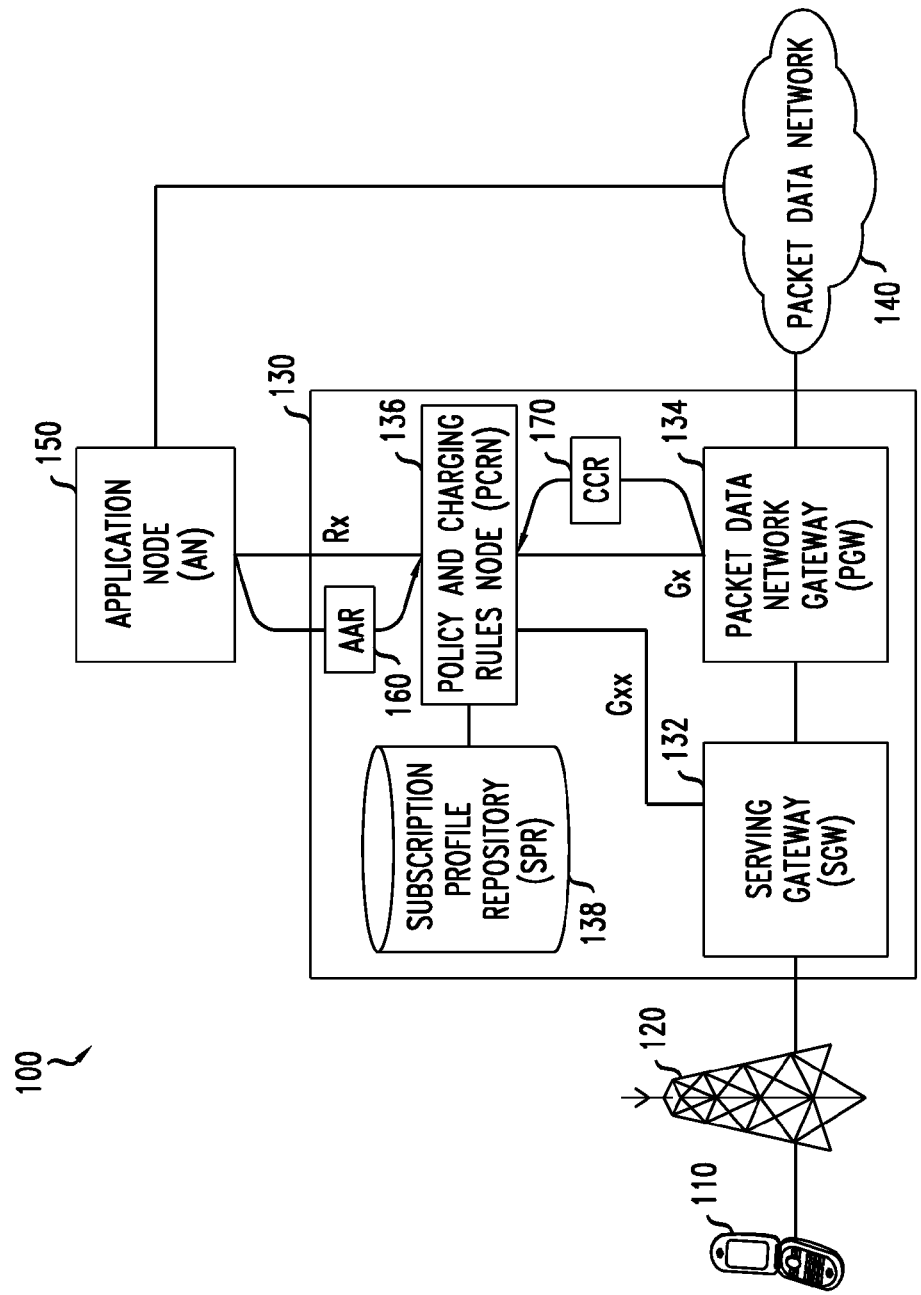
FIG. 1 illustrates an exemplary subscriber network for providing various data services.

Referring now to the drawings, in which like numerals refer to like components or steps, there are disclosed broad aspects of various exemplary embodiments.

FIG. 1 illustrates an exemplary subscriber network 100 for providing various data services. Exemplary subscriber network 100 may be a telecommunications network or other network for providing access to various services. Exemplary subscriber network 100 may include user equipment 110, base station 120, evolved packet core (EPC) 130, packet data network 140, and application node (AN) 150.

User equipment 110 may be a device that communicates with packet data network 140 for providing the end-user with a data service. Such data service may include, for example, voice communication, text messaging, multimedia streaming, and Internet access. More specifically, in various exemplary embodiments, user equipment 110 is a personal or laptop computer, wireless email device, cell phone, smart phone, television set-top box, or any other device capable of communicating with other devices via EPC 130.

Base station 120 may be a device that enables communication between user equipment 110 and EPC 130. For example, base station 120 may be a base transceiver station such as an evolved nodeB (eNodeB) as defined by 3GPP standards. Thus, base station 120 may be a device that communicates with user equipment 110 via a first medium, such as radio waves, and communicates with EPC 130 via a second medium, such as Ethernet cable. Base station 120 may be in direct communication with EPC 130 or may communicate via a number of intermediate nodes (not shown). In various embodiments, multiple base stations (not shown) may be present to provide mobility to user equipment 110. Note that in various alternative embodiments, user equipment 110 may communicate directly with evolved packet core 130. In such embodiments, base station 120 may not be present.

Evolved packet core (EPC) 130 may be a device or network of devices that provides user equipment 110 with gateway access to packet data network 140. EPC 130 may further charge a subscriber for use of provided data services and ensure that particular quality of experience (QoE) standards are met. Thus, EPC 130 may be implemented, at least in part, according to the 3GPP TS 29.212, 29.213, and 29.214 standards. Accordingly, EPC 130 may include a serving gateway (SGW) 132, a packet data network gateway (PGW) 134, a policy and charging rules node (PCRN) 136 and a subscriber profile repository (SPR) 138.

Serving gateway (SGW) 132 may be a device that manages data paths between the base station 120 and PGW 134. The data paths may include virtual containers called bearers with unique Quality of Service (QoS) characteristics. The bearers may include virtual connections called service data flows (SDFs). In various embodiments where user equipment 110 is a mobile device and base station 120 is an eNodeB, SGW 132 may be responsible for establishing new bearers when the mobile device changes eNodeB. The SGW 132 may implement a bearer binding and event reporting function (BBERF) according to the 3GPP TS 29.212, 29.213, and 29.214 standards. In various embodiments, EPC 130 may include multiple serving gateways.

Packet data network gateway (PGW) 134 may be a device that provides gateway access to packet data network 140. PGW 134 may be the final device within the EPC 130 that receives packets sent by user equipment 110 toward packet data network 140 via SGW 132. PGW 134 may include a policy and charging enforcement function (PCEF) that enforces policy and charging control (PCC) rules for each service data flow (SDF). Thus, PGW 134 may be a policy and charging enforcement node (PCEN). PGW 134 may request new PCC rules from PCRN 136 by sending a CCR message via the Gx interface. PGW 134 may also include a number of additional features such as, for example, packet filtering, deep packet inspection, and subscriber charging support.

Policy and charging rules node (PCRN) 136 may be a device that receives requests for application services, generates PCC rules, and provides PCC rules to the PGW 134 and/or other PCENs (not shown). PCRN 136 may be in communication with AN 150 via an Rx interface. PCRN 136 may receive a service request in the form of an AA-Request (AAR) 160 from AN 150. PCRN 136 may also be in communication with SGW 132 and PGW 134 via a Gxx and a Gx interface, respectively. PCRN 136 may receive a service request in the form of a credit control request (CCR) 170 from SGW 132 or PGW 134. In various embodiments, AAR 160 and CCR 170 may represent two independent service requests to be processed separately, while in other embodiments, AAR 160 and CCR 170 may carry information regarding a single service request and PCRN 136 may create at least one PCC rule based on the combination of AAR 160 and CCR 170. In various embodiments, PCRN 136 may be capable of handling both single-message and paired-message service requests.

Upon creating a new PCC rule or upon request by the PGW 134, PCRN 136 may provide a PCC rule to PGW 134 via the Gx interface. In various embodiments, such as those implementing the PMIP standard for example, PCRN 136 may also generate QoS rules. Upon creating a new QoS rule or upon request by the SGW 132, PCRN 136 may provide a QoS rule to SGW 132 via the Gxx interface.

As will be discussed in further detail below, PCRN 136 may receive a request to update a PCC rule with new filters. PCRN 136 may receive an update CCR 170 from PGW 134 indicating one or more new filters and a reference filter. PCRN 136 may determine an existing PCC rule and related information based on the reference filter. PCRN 136 may determine new QoS-information for the PCC rule using information regarding the new filters and existing filters. PCRN 136 may also control for removed filters and flow direction. PCRN 136 may generate a new PCC rule to replace the existing PCC rule.

Subscription profile repository (SPR) 138 may be a device that stores information related to subscribers to the subscriber network 100. Thus, SPR 138 may include a machine-readable storage medium such as read-only memory (ROM), random-access memory (RAM), magnetic disk storage media, optical storage media, flash-memory devices, and/or similar storage media. SPR 138 may be a component of PCRN 136 or may constitute an independent node within EPC 130. Data stored by SPR 138 may include an identifier of each subscriber and indications of subscription information for each subscriber such as bandwidth limits, charging parameters, subscriber priority, and subscriber service preferences.

Packet data network 140 may be any network for providing data communications between user equipment 110 and other devices connected to packet data network 140, such as AN 150. Further, packet data network 140 may provide, for example, phone and/or Internet service to various user devices in communication with packet data network 140.

Application Node (AN) 150 may be a device that provides an application service to user equipment 110. Thus, AN 150 may be a server or other device that provides, for example, streaming video service to user equipment 110. AN 150 may further be in communication with the PCRN 136 of the EPC 130 via an Rx interface. When AN 150 is to begin providing application service to user equipment 110, AN 150 may generate a service request message, such as an AA-Request (AAR) according to the Diameter protocol, to notify the PCRN 136 that resources should be allocated for the application service. Such an service request message may include information such as an identification of the subscriber using the application service and an identification of the particular SDFs and filters that must be established within an IP-CAN session in order to provide the requested service. AN 150 may communicate such an service request to the PCRN via the Rx interface 215.

Figure 2:
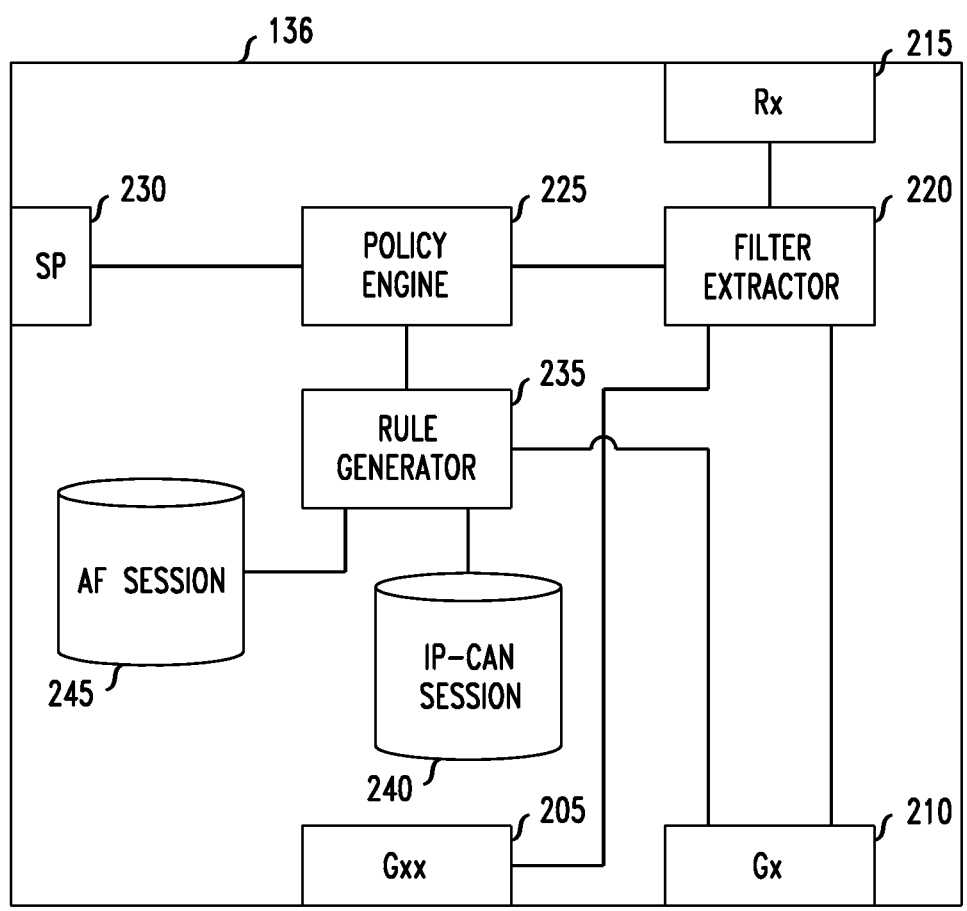
FIG. 2 illustrates an exemplary policy and charging rules node (PCRN) for creating policy and charging control (PCC) rules in response to service requests.

FIG. 2 illustrates an exemplary policy and charging rules node (PCRN) 136 for creating policy and charging control (PCC) rules in response to service requests. PCRN 136 may include Gxx interface 205, Gx interface 210, Rx interface 215, service filter extractor 220, policy engine 225, Sp interface 230, rule generator 235, IP-CAN session information storage 240, and AF Session information storage 245.

Gxx interface 205 may be an interface comprising hardware and/or executable instructions encoded on a machine-readable storage medium configured to communicate with a SGW such as SGW 132. Such communication may be implemented according to the 3GPP TS 29.212. Thus, Gxx interface 205 may receive requests for QoS rules and transmit QoS rules for installation. Gxx interface 205 may further receive UE-originated service requests in the form of a CCR.

Gx interface 210 may be an interface comprising hardware and/or executable instructions encoded on a machine-readable storage medium configured to communicate with a PGW such as PGW 134. Such communication may be implemented according to the 3GPP TS 29.212. Thus, Gx interface 210 may receive requests for PCC rules and transmit PCC rules for installation. Gx interface 210 may further receive UE-originated service requests in the form of a CCR, such as CCR 170.

Rx interface 215 may be an interface comprising hardware and/or executable instructions encoded on a machine-readable storage medium configured to communicate with an AN such as AN 150. Such communication may be implemented according to the 3GPP TS 29.214. For example, Rx interface 205 may receive a service request such as an AAR from AN 150.

Filter extractor 220 may include hardware and/or executable instructions on a machine-readable storage medium configured to determine from a service request, at least one filter for providing the requested service. As will be described in greater detail below with respect to FIGS. 3-4, a service request may identify a number of streams for providing the requested service. Each stream may include one or more packet filters that describe packets associated with the stream. Filter extractor 220 may identify filters within a service request. Each filter may include information such as a filter identifier, a precedence, a flow label, and a flow direction. Service flow extractor 220 may assign SDFs resulting from those streams a requested bandwidth based on other QoS information in the service request such as, for example, a bandwidth requested at a higher level. Filter extractor 220 may also associate filters with QoS information received in a request. For example, a CCR 170 may include a QoS-Information AVP including maximum or guaranteed bandwidths in the uplink and downlink directions.

Policy engine 225 may include hardware and/or executable instructions on a machine-readable storage medium configured to authorize the QoS information of a received service request and/or a set of filters. Policy engine 225 may authorize one set of QoS information for multiple filters associated with an updated PCC rule including both existing filters and new filters. Policy engine 225 may authorize the QoS information based on subscriber data stored in SPR 138. Policy engine 225 may request subscriber data records from SPR 138 via Sp interface 230. If the requested QoS information exceeds the QoS allowed by the subscriber data record, policy engine 225 may reduce the requested QoS information to comply with the subscriber data record. Policy engine 225 may also deny the service request if the requested QoS information is not allowed by the subscriber data. Policy engine 225 may also limit the requested QoS information based on QoS limits of the requested bearer.

Sp interface 230 may be an interface comprising hardware and/or executable instructions encoded on a machine-readable storage medium configured to communicate with a SPR such as SPR 138. Thus, Sp interface 230 may transmit record requests and receive subscription profile records.

Rule generator 235 may include hardware and/or executable instructions on a machine-readable storage medium configured to generate new and updated PCC rules based on received service requests, filters extracted by the filter extractor 220, and/or authorized QoS information. Rule generator may first generate a new PCC rule object. Rule generator 235 may also insert other data into the PCC rule, including information ascertained from the AAR, CCR, and/or SDF such as, for example, bandwidth, flow status, and/or flow descriptions. Rule generator 235 may insert more than one filter into a PCC rule. The QoS information for the group of filters may be inserted into the PCC rule. Thus, the PCC rule may have multiple filters sharing the same set of QoS information. At this point, the new PCC rule may be a valid rule ready for installation. Rule generator 230 may transmit the rule to PGW 134 via Gx interface 210 for installation. Rule generator 235 may also store the rule in IP-CAN session information storage 240. As will be discussed in further detail below, rule generator 235 may update an existing PCC upon receipt of a resource update request. Rule generator 235 may add or remove filters and include new authorized QoS information for an updated PCC rule.

IP-CAN session information storage 240 may be any machine-readable medium capable of storing IP-CAN session information. For example, IP-CAN session information storage 240 may store PCC rules generated by the PCRN 136. Accordingly, IP-CAN session information storage 240 may include a machine-readable storage medium such as read-only memory (ROM), random-access memory (RAM), magnetic disk storage media, optical storage media, flash-memory devices, and/or similar storage media. As will be described in further detail below with respect to FIG. 5, IP-CAN session information storage 240 may store definitions of numerous PCC rules created by PCRN 136. Such definitions may include, for example, rule names, service data flow filters, QoS parameters, and charging parameters.

AF session information storage 245 may be any machine-readable medium capable of storing AF session information. For example, AF session information storage 245 may store information received in AAR messages 160. Accordingly, AF session information storage 245 may include a machine-readable storage medium such as read-only memory (ROM), random-access memory (RAM), magnetic disk storage media, optical storage media, flash-memory devices, and/or similar storage media. In various embodiments, AF information storage 245 may be a data structure located on the same physical device as IP-CAN session information storage 240.

Figure 3:
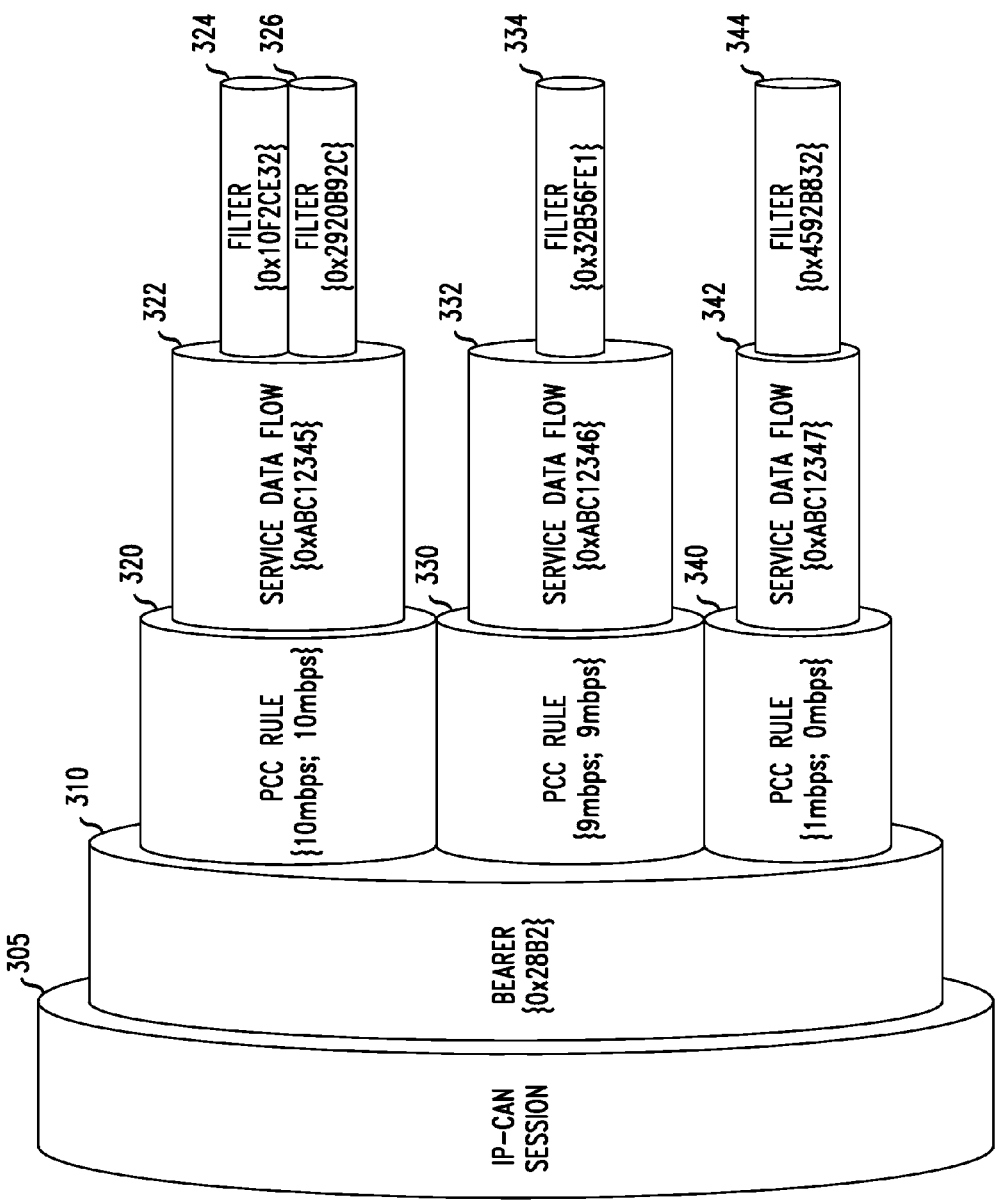
FIG. 3 illustrates an exemplary communication link implementing PCC rules having multiple filters.

FIG. 3 illustrates an exemplary communication link 300 implementing PCC rules having multiple filters. Communication link 300 may include IP-CAN session 305, bearer 310, PCC rules 320, 330 and 340, service data flows 322, 332, 342, and filters 324, 326, 334, and 344.

IP-CAN session 305 may be a session establishing a communication link between UE 110 and PGW 134. IP-CAN session 305 may assign an IP address to UE 110 to enable communication with packet data network 140. IP-CAN session 305 may include bearers such as bearer 310. IP-CAN session 305 may also include other bearers (not shown) such as a default bearer and other dedicated bearers.

Bearer 310 may be a bearer carrying traffic. Bearer 310 may include the identifier "0x28B2" to uniquely identify the bearer within IP-CAN session 305. Bearer 310 may include PCC rules 320, 330 and 340 to manage QoS.

PCC rule 320 may establish maximum bandwidths of 10 mbps uplink and 10 mbps downlink. PCC rule 320 may also include other QoS information for managing QoS and charging for service. PCC rule 320 may include a service data flows such as, for example, service data flow 322. Service data flow 322 may include filters 324 and 326. Filters 324 and 326 may each identify traffic to be processed according to the PCC rule 320.

PCC rule 330 may establish maximum bandwidths of 9 mbps uplink and 9 mbps downlink. PCC rule 330 may include service data flow 332. The service data flow 335 may include filter 334. PCC rule 330 may illustrate a PCC rule that has been split off of, for example, PCC rule 320. The flows in PCC rule 320 and PCC rule 330 may have been included in a single service request. However, the flow 334 of PCC rule 330 may have been allocated a separate set of QoS information, and therefore may have been placed into a separate PCC rule 330.

PCC rule 340 may establish maximum bandwidths of 1 mbps uplink and 0 mbps downlink. PCC rule 340 may include service data flow 342. Service data flow 342 may include filter 344. PCC rule 340 may illustrate a PCC rule that has been split off of, for example, PCC rule 320. The filters in PCC rule 320 and PCC rule 340 may have been included in a single service request. However, the filter 344 of PCC rule 340 may be for an RTCP flow, and therefore may have been placed into a separate PCC rule 340.

Figure 4:
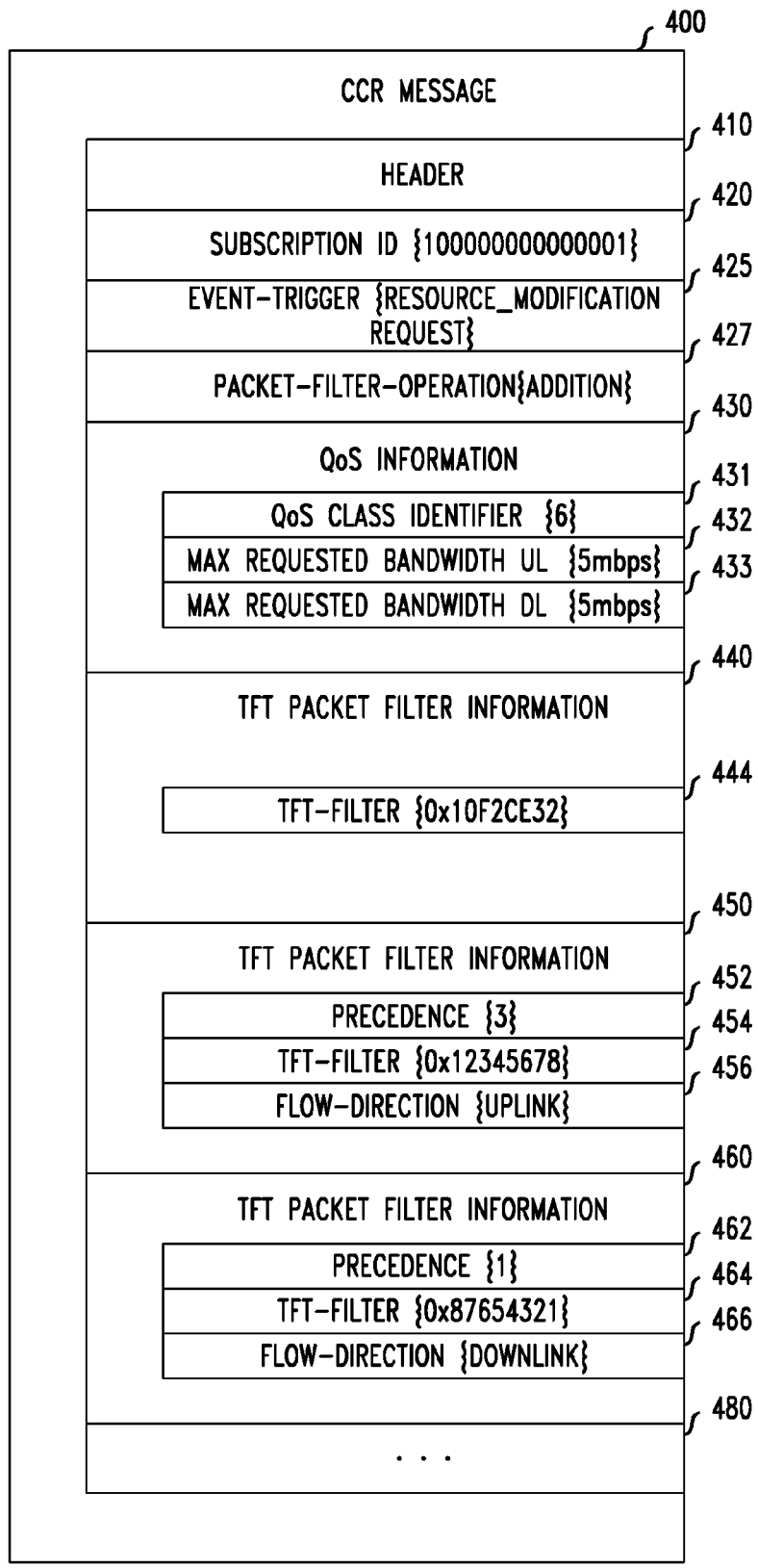
FIG. 4 illustrates an exemplary user equipment-originated service request update message.

FIG. 4 illustrates an exemplary user equipment-originated service request update message in the form of a CCR 400. CCR 400 may be constructed according to the Diameter message protocol and/or 3GPP TS 29.212. Accordingly, CCR 400 may include a header 410, subscription ID field 420, event trigger field 425, packet-filter operation field 427, QoS information field 430, packet filter information fields 440, 450, and 460, and a number of additional fields 480. Note that the order of the fields of CCR 400 may vary. Thus, for example, subscription ID field 420 may be located after QoS information field 430. CCR messages may be used for different types of networks such as, for example, GPRS and EPS/LTE. Although FIG. 4 is shown as a request for a GPRS network, it should be appreciated that EPS/LTE or other networks may make requests using similar information.

Header 410 may be a standard Diameter header indicating that message 400 is a CCR. Thus, header 410 may include a command code field set to a value of 258 and the R-bit field of the command flags field set, as provided for by the Diameter protocol and 3GPP TS 29.212.

Subscription ID field 420 may be an attribute-value pair (AVP) for indicating a subscription that is associated with the particular request. For example, subscription ID field 430 indicates that the subscription identified by the value "100000000000001" is associated with CCR 400. This information may be used to access a subscription profile record and charge the appropriate subscriber in relation to the requested service.

Event trigger field 425 may indicate that the CCR 400 was generated in response to a resource modification request by a UE 110. Accordingly, event trigger field 425 may have the value "RESOURCE_MODIFICATION_REQUEST." A network node such as, for example, PCRN 136 receiving CCR 400 may identify CCR 400 as session update message based on the presence and value of event trigger field 425.

Packet-Filter-Operation field 427 may indicate a type of operation requested by CCR 400. For example, if Packet-Filter-Operation field 427 includes the value "ADDITION," the CCR message 400 may be requesting to add at least one additional filter to an existing session. Packet-Filter-Operation field 427 may also have values of "DELETION" and "MODIFICATION."

QoS information field 430 may contain requested QoS settings for the requested service. QoS information field 430 may apply to every packet information field included in CCR 400 as well as to packet filters already existing within a session. QoS information field 430 may include QoS Class identifier (QCI) field 431, maximum requested bandwidth uplink (MRB UL) field 432, maximum requested bandwidth downlink (MRB DL) field 433, and other fields useful for describing the QoS. QCI field 431 may include an identifier indicating the type of traffic requested. MRB UL 432 may indicate that the maximum bandwidth used by the service in the uplink direction is 20 mbps. MRB DL field 433 may indicate that the maximum bandwidth used by the requested service in the downlink direction is 20 mbps.

Packet filter information fields 440, 450, and 460 may contain service information related to each requested flow for the requested service. In various embodiments, such as those implementing LTE for example, packet filter information fields 440, 450, and 460 may be Packet-Filter-Information AVPs. In various alternative embodiments, such as those implementing GPRS for example, packet filter information fields 440, 450, and 460 may be TFT-Packet-Filter-Information AVPs. Packet filter information fields 440, 450 and 460 may include a precedence field, a filter content field and additional information such as, for example, a type of service, traffic class, flow direction and/or flow label.

Packet filter information field 440 may be a reference filter. Packet filter information field 440 may be included within CCR 400 in order to reference an existing session that is being modified by the request. As a reference filter, packet filter information field 440 may include less than a full set of filter information. For example, packet filter information field 440 may indicate only an identifier of the existing filter. As an example of packet filter information, packet filter information field 440 describes a TFT packet filter "0x10F2CE32".

Packet filter information fields 450 and 460 may be new packet filters. As an example of packet filter information, packet filter information field 450 describes a TFT packet filter "0x12345678" with a precedence of 3 and a flow-direction of UPLINK. As another example, packet filter information field 460 describes a TFT packet filter "0x87654321" with a precedence of 1 and a flow-direction of DOWNLINK.

Additional fields 480 may include additional information as specified by the Diameter protocol and/or 3GPP TS 29.212. Thus, additional fields 480 may include additional attribute value pairs (AVPs) such as the CC-Request-Type AVP, Framed-IP-Address AVP, 3GPP-SGSN-Address AVP, etc. Additional fields 480 may be used in extracting other useful information such as, for example, flow identifying information.

FIG. 5 illustrates an exemplary data arrangement for storing PCC rules. Data arrangement 500 may be, for example, a table in a database stored in IP-CAN session information storage 240. Alternatively, data arrangement 500 may be a series of linked lists, an array, or a similar data structure. Thus, it should be apparent that data arrangement 500 is an abstraction of the underlying data; any data structure suitable for storage of this data may be used.

Data arrangement 500 may include data fields such as, for example, rule name field 505, service data flow filters field 510, QoS parameters field 520, flow direction field 525, bearer field 530, and session field 535. Data arrangement 500 may include additional fields (not shown) required or useful in defining PCC rules. Data arrangement 500 may include multiple entries for rules such as, for example, rules 540, 550, 560, 570, and 580.

Rule name field 505 may indicate a rule name assigned to the PCC rule. The rule name may be assigned by rule generator 235 at the time the rule is generated. Service data flow filters field 510 may include one or more packet filters describing traffic packets associated with the data flow. The packet filters may be listed in order of their flow number. The presence of a packet filter within service data flow filters field 510 may indicate that the PCC rule should apply to any packet that matches the packet filter. QoS parameters field 520 may include QoS information for a PCC rule such as, for example, the QCI, MRB UL and MRB DL. QoS parameters field 520 may also include an Allocation Retention Priority (ARP) that indicates the priority of the requested service in case the network must drop traffic or services. Flow direction field 525 may indicate a direction for each filter. Bearer field 530 may identify a bearer that may carry traffic associated with the PCC rule. In various embodiments such as, for example, those using GPRS with a UE only bearer control mode, if no bearer is identified, the default bearer may carry the traffic. In various alternative embodiments such as, for example, in the case of LTE, no bearer identifier may be required and each PCC rule may be carried in a dedicated bearer. Session field 535 may indicate the IP-CAN session associated with the PCC rule.

As an example of an entry in data arrangement 500, rule 540 indicates a rule with the rule name "0x82A1." Rule 540 may be a PCC rule corresponding to PCC rule 320. Rule 540 includes two filters: "0x10F2CE32," and "0x2929B92C." The QCI of the traffic is 6. The MRB UL is 10 mbps and the MRB DL is 10 mbps. Because the PCC rule includes only one set of QoS information, the service data flows may share the requested bandwidth. The rule indicates that traffic may be carried by bearer "0x28B2," which may have been created as a dedicated bearer when the rule was created. The rule is associated with a session "0x732A," which may be an IP-CAN session.

As another example of an entry in data arrangement 500, rule 550 indicates a rule with the rule name "0x82A2." Rule 550 may be a PCC rule corresponding to PCC rule 330. Rule 550 includes one filter, "0x32B56FE1." The QCI of the traffic is 6. The MRB UL is 9 mbps and the MRB DL is 9 mbps. The traffic associated with the PCC rule is assigned to bearer "0x28B2" and associated with session "0x732A."

As another example of an entry in data arrangement 500, rule 560 indicates a rule with the rule name "0x82A3." Rule 560 may be a PCC rule corresponding to PCC rule 340. Rule 560 includes one flow description, "0x45192B832." The QCI of the traffic is 6. The MRB UL is 1 mbps and the MRB DL is 0 mbps. The traffic associated with the PCC rule is assigned to bearer "0x28B2" and associated with session "0x732A."

As another example of an entry in data arrangement 500, rule 570 may be an updated version of rule 540. Rule 540 may be deleted when rule 570 is created. Both rules are shown in FIG. 5 for convenience. Rule 570 may include four filters: the two original filters from rule 540, "0x10F2CE32," and "0x2929B92C," and the two new filters from CCR 400, "0x12345678" and "0x87654321." The QoS parameters 520 of rule 570 may indicate a QCI of 6, MRB UL of 10 mbps and a MRB DL of 15 mbps. This QoS information may have been determined and authorized responsive to the update request, as will be described in further detail below.

FIG. 6 illustrates an exemplary data arrangement 600 for storing AF session information. Data arrangement 600 may be, for example, a table in a database stored in AF session information storage 245. Alternatively, data arrangement 600 could be a series of linked lists, an array, or a similar data structure. Thus, it should be apparent that data arrangement 600 is an abstraction of the underlying data; any data structure suitable for storage of this data may be used.

Data arrangement 600 may include data fields such as, session field 610, service data flow filters 620, QoS parameters 630, flow direction 640, flow status 650 and flow usage 660. Session field 610 may indicate a session identifier assigned to the record when an AAR 160 message is received. Service data flow filters 620 may include a list of filters included in an AAR 160 message. QoS Parameters 630 may include one or more sets of QoS information supplied by an AAR 160 message. The QoS information may be associated with individual filters or groups of filters. Flow direction field 640 may indicate a direction of each filter. Flow status 650 may indicate a status of each filter. Flow usage 660 may indicate a usage of each filter if specified.

Data arrangement 600 may include one or more entries 660. For example, entry 660 may store information for a session identified as "0xE426," which may correspond to an AAR 160 used in the creation of PCC rules 540, 550, and 560. The entry 660 may indicate service data flow filters "0x10F2CE32," "0x2920B92C, "0x32B56FE1," and "0x4592B832." The entry 660 may indicate QoS parameters of 9 mbps uplink and 9 mbps downlink allocated to a single filter "3: 0x32B56FE1" and 20 mbps uplink and 20 mbps downlink allocated to the request as a whole. The entry 660 may indicate the filters have flow directions 640 of uplink, downlink, downlink, and uplink, respectively. Similarly, the entry 660 may indicate the filters have a flow status of open, open, removed, and removed, respectively. Entry 660 may indicate a flow usage of RTCP for "0x4592B832," and no available flow usage for the remaining flows.

Figure 7:
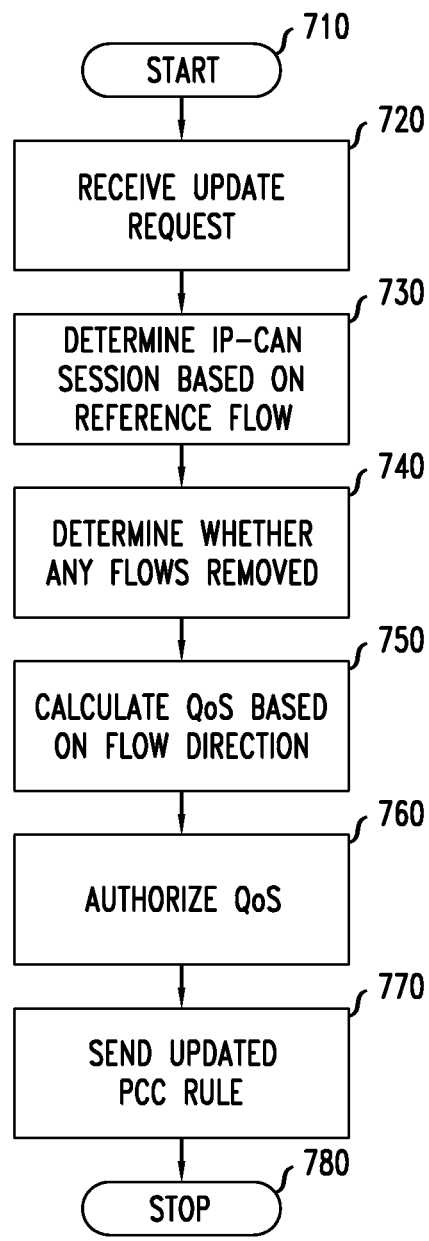

FIG. 7 illustrates a flowchart showing an exemplary method 700 of updating a PCC rule. The method 700 may be performed by a policy and charging rules node such as PCRN 136. The method 700 may begin at step 710 and proceed to step 720.

In step 720, the PCRN 136 may receive an update request such as CCR 400. As described above, the update request may include a reference flow and at least one new flow.

In step 730, the PCRN 136 may determine an IP-CAN session based on the reference flow. PCRN 136 may search a database such as IP-CAN session storage 245 for a session matching a filter ID of a reference flow included in the update request. The record for the IP-CAN session may also include information for other flows included in the same rule as the reference flow. However, the record may exclude flows that have been removed.

In step 740, the PCRN 136 may determine whether any flows had been removed from the PCC rule. PCRN 136 may cross-reference information of the IP-CAN session against information for AF sessions, for example, information stored in AF session storage 245. PCRN 136 may search the AF session information for each flow identifier to determine whether additional information is available regarding an AF session. The AF session information may include information indicating a rule split among the filters. For example, the AF session information may indicate that one or more of the filters has been removed because it is an RTCP flow. An RTCP flow may be used for signaling and may be given a separate PCC rule having a separate bandwidth. The AF session information for an RTCP flow may indicate that the flow-usage is RTCP or that the flow-status is removed. In various embodiments, flows may be removed for additional reasons. For example, an AF request may have indicated a separate bandwidth for one or more flows and PCRN 136 may have generated a separate PCC rule for the flows having the specified bandwidth. Accordingly, such flows may also be considered to be removed. The flows within the set of flows that have not been removed may be remaining filters.

In step 750, the PCRN 136 may calculate a requested QoS based on the flow information of the remaining filters. PCRN 136 may include the requested bandwidth for each remaining filter that has not been removed. If a flow has been removed, PCRN 136 may exclude that flow from the QoS calculation. PCRN 136 may determine a bandwidth for each direction. PCRN 136 may include in the requested bandwidth for each direction only those flows that are compatible with that direction according to a flow-direction. For the downlink direction, PCRN 136 may include flows with DOWNLINK direction and BIDIRECTIONAL direction. For the uplink direction, PCRN 136 may include flows with UPLINK direction and BIDIRECTIONAL direction. PCRN 136 may request QoS authorization for the flows that are not removed and are consistent with each direction.

In step 760, PCRN 136 may authorize the requested QoS. PCRN 136 may make a policy decision to determine whether the subscriber is authorized to receive the requested QoS. The PCRN 136 may determine whether to authorize the QoS based on subscriber information received from SPR 138 via Sp interface 230.

In step 770, PCRN 136 may send an updated PCC rule to a PCEF such as, for example, PGW 134. The updated PCC rule may replace an existing PCC rule at the PCEF. The updated PCC rule may include the authorized bandwidth for each direction and the authorized filters. In various embodiments, PCRN 136 may also send a QoS rule to SGW 134 based on the PCC rule. The method 700 may then proceed to step 780, where the method 700 may end.

Having described the various components of exemplary network 100 including PCRN 136, an example of a method of updating a PCC rule will now be provided. FIG. 3 may illustrate an exemplary communication link before an update request CCR 170 is received at PCRN 136. Accordingly, PCC rules 540, 550, and 560 may be active and stored in IP-CAN session information storage 240 and installed at PGW 134. Upon receipt of CCR 400, PCRN 136 may determine that filter 440 is a reference filter based on the event trigger 425 and the presence of only the filter identifier 444. Accordingly, PCRN 136 may search session information storage 240 for an active PCC rule corresponding to the received reference filter.

PCRN 136 may match filter identifier 444 against rule 540, which includes the same filter. PCRN 136 may also associate rule 540 with other rules in the same bearer or same session. Accordingly, PCRN 136 may associate the received request with rules 540, 550, and 560. PCRN 136 may also search AF session information storage 245 for the reference filter 444. PCRN 136 may identify entry 660 because it includes the same filter. Entry 660 may provide information that is unavailable in the IP-CAN session information storage 240 such as flow status field 650 and flow usage field 660. PCRN 136 may combine information regarding both existing filters and new filters to process the update request. Accordingly, in this example, PCRN 136 may initially consider six filters: "0x10F2CE32," "0x2920B92C," "0x32B56FE1," "0x4592B832," "0x12345678," and "0x87654321." PCRN 136 may determine that filters "0x32B56FE1," and "0x4592B832," have been removed because flow status 650 indicates a removed status and flow usage 660 indicates that filter "0x4592B832" has been removed. PCRN 136 may exclude the removed filters from the update PCC rule. PCRN 136 may also subtract the bandwidth required by those filters from the QoS authorization. Accordingly, PCRN 136 may subtract the 9 mpbs in each direction allocated to filter "0x32B56FE1" and 1 mpbs in the uplink direction allocated for filter "0x4592B832." Alternatively, PCRN 136 may exclude the bandwidth allocated to the removed filters when adding the bandwidth requested for the updated PCC rule.

When determining the QoS for the updated PCC rule, PCRN 136 may take into account the flow direction for each filter. Accordingly, PCRN 136 may consider flows "0x10F2CE32" and "0x12345678" for the uplink direction and flows "0x10F2CE32" "0x2920B92C" and "0x87654321" for the downlink direction. Accordingly, PCRN 136 may authorize 10 mbps uplink and 15 mbps downlink for the updated PCC rule. PCRN 136 may authorize the bandwidths and other QoS information according to subscriber information. If the QoS information is authorized, PCRN 136 may generate PCC rule 570 to replace PCC rule 540, and forward the updated PCC rule 570 to PGW 134 for enforcement.

According to the foregoing, various exemplary embodiments provide updating PCC rules with new filters. In particular, by excluding removed filters from the updated PCC rule and taking into account flow direction, a PCRN may authorize QoS information for updated PCC rules.

It should be apparent from the foregoing description that various exemplary embodiments of the invention may be implemented in hardware and/or firmware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a personal or laptop computer, a server, or other computing device. Thus, a machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principals of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A method of updating a policy and charging control (PCC) rule, the method comprising:
   receiving a filter update request comprising a new filter and a reference filter;
   matching the reference filter with a previously requested PCC rule;
   determining a set of filters associated with a service data flow;
   determining whether any filter of the set of filters was previously removed by determining whether a flow-status for the filter indicates the filter has been removed;
   excluding any removed filter from the set of filters leaving remaining filters; and
   authorizing quality of service (QoS) information based on the remaining filters of the set of filters.

2. The method of claim 1, wherein the step of determining whether a filter has been removed comprises determining whether the filter is associated with the Real Time Control Protocol (RTCP) and determining that the filter has been removed based on the filter being associated with RTCP.

3. The method of claim 1, wherein the filter update request further comprises a flow direction, wherein the step of authorizing QoS information comprises adding the bandwidth for each filter having a direction consistent with the flow direction.

4. The method of claim 1, wherein the step of matching the reference flow with a previously requested PCC rule comprises searching a record of IP-CAN sessions for a session including the reference filter.

5. The method of claim 4, wherein the record of IP-CAN sessions comprises a filter-ID assigned by the PCRN.

6. The method of claim 1, further comprising generating a filter ID for the new filter.

7. The method of claim 1, wherein the step of determining whether a filter has been removed comprises searching a record of application function (AF) sessions.

8. The method of claim 1, wherein the step of authorizing QoS information comprises:
   determining an uplink bandwidth as the sum of filters compatible with the uplink direction; and
   determining a downlink bandwidth as the sum of filters compatible with the downlink direction.

9. A non-transitory machine-readable storage medium encoded with instructions executable by a processor for updating a policy and charging control (PCC) rule, the non-transitory machine-readable storage medium comprising:
   instructions for receiving a filter update request comprising a new filter and a reference filter;
   instructions for matching the reference filter with a previously requested PCC rule;
   instructions for determining a set of filters associated with a service data flow;
   instructions for determining whether any filter of the set of filters was previously removed by determining whether a flow-status for the filter indicates the filter has been removed;
   instructions for authorizing quality of service (QoS) information based on the remaining filters of the set of filters.

10. The non-transitory machine-readable storage medium of claim 9, wherein the instructions for determining whether a filter has been removed comprise instructions for determining whether the filter is associated with the Real Time Control Protocol (RTCP) and determining that the filter has been removed based on the filter being associated with RTCP.

11. The non-transitory machine-readable storage medium of claim 9, wherein the filter update request further comprises a flow direction, wherein the instructions for authorizing QoS information comprise instructions for adding the bandwidth for each filter having a direction consistent with the flow direction.

12. The non-transitory machine-readable storage medium of claim 9, wherein the instructions for matching the reference flow with a previously requested PCC rule comprise instructions for searching a record of IP-CAN sessions for a session including the reference filter.

13. The non-transitory machine-readable storage medium of claim 12, wherein the record of IP-CAN sessions comprises a filter-ID assigned by the PCRN.

14. The non-transitory machine-readable storage medium of claim 9, further comprising instructions for generating a filter ID for the new filter.

15. The non-transitory machine-readable storage medium of claim 9, wherein the instructions for determining whether a filter has been removed comprise instructions for searching a record of application function (AF) sessions.

16. The non-transitory machine-readable storage medium of claim 9, wherein the instructions for authorizing QoS information comprise:
   instructions for determining an uplink bandwidth as the sum of filters compatible with the uplink direction; and
   instructions for determining a downlink bandwidth as the sum of filters compatible with the downlink direction.

* * * * *